United States Patent [19]

Redlich et al.

[11] Patent Number: 4,821,250

[45] Date of Patent: Apr. 11, 1989

[54] PROCESS AND APPARATUS FOR THE RECORDING OF AN INFORMATION SIGNAL

[75] Inventors: Horst Redlich; Guenter Joschko, both of Berlin, Fed. Rep. of Germany

[73] Assignee: DMM Master Technik GmbH fur Informationstrager, Berlin, Fed. Rep. of Germany

[21] Appl. No.: 883,629

[22] Filed: Jul. 9, 1986

[30] Foreign Application Priority Data

Aug. 1, 1985 [DE] Fed. Rep. of Germany ....... 3527606

[51] Int. Cl.⁴ ..................... G11B 11/16; G11B 11/18
[52] U.S. Cl. ...................................... 369/18; 369/16; 369/132
[58] Field of Search ................... 369/132, 130, 16, 17, 369/18, 14, 13; 360/59

[56] References Cited

U.S. PATENT DOCUMENTS

| | | | |
|---|---|---|---|
| 2,074,406 | 3/1937 | Lohn et al. ........................ | 369/13 |
| 3,805,100 | 4/1974 | Klemp et al. ..................... | 369/18 |
| 3,865,997 | 2/1975 | Halter ........................ | 179/100.41 P |
| 3,946,149 | 3/1976 | White ............................ | 369/132 |
| 4,044,379 | 8/1977 | Halter ............................ | 358/128 |
| 4,363,844 | 12/1982 | Lewis et al. ..................... | 369/275 |

FOREIGN PATENT DOCUMENTS

| | | |
|---|---|---|
| 0062336 | 10/1982 | European Pat. Off. . |
| 2216051 | 11/1973 | Fed. Rep. of Germany . |
| 2752022 | 5/1979 | Fed. Rep. of Germany . |
| 2919482 | 9/1980 | Fed. Rep. of Germany . |
| 2935579 | 3/1981 | Fed. Rep. of Germany . |
| 3224327 | 1/1984 | Fed. Rep. of Germany . |
| 60-89848 | 5/1985 | Japan . |
| 2065954 | 7/1981 | United Kingdom . |

OTHER PUBLICATIONS

Patent Abstracts of Japan, Band 9, Nr. 236 (P-390) (1959) Sep. 21, 1985.
Article "Surface Acoustic Wave Stylus: Part 1-Pickup and Recording Devices", S. Tosima, et al. (RCA Review, vol. 44, Sep. 1983).

*Primary Examiner*—Alan Faber
*Assistant Examiner*—Hoa T. Nguyen
*Attorney, Agent, or Firm*—Burns, Doane, Swecker & Mathis

[57] ABSTRACT

A process and an apparatus are specified for recording a digital signal onto a recording carrier (4), in particular a signal for recording in compact disc data format, in which an engraving or cutting stylus (2) is pressed substantially by dead weight alone against the recording carrier (4) and, in operating mode, describes a path which lies beneath the undeformed surface of the recording carrier (4) during an indentation to be engraved and on or above the undistorted surface of the recording carrier (4) between two indentations, the common center of gravity position of the engraving stylus (2) and positioning element (1) connected rigidly to it remaining substantially stable in position.

24 Claims, 2 Drawing Sheets

PROCESS AND APPARATUS FOR THE RECORDING OF AN INFORMATION SIGNAL

BACKGROUND OF THE INVENTION

Field of the Invention

The present invention generally relates to the recording of information signals onto plate-like, metallic recording carriers.

For nearly a century, sound has been recorded in analog fashion, i.e., by electromechanically cutting information signals into the surface of a recording carrier and then repeatedly copying the recording to produce finished phonograph discs. In recent years, however, digital sound and data recording have gained significance. In digital recordings, information is applied to a recording carrier by complicated optical and chemical processes and then is read from the carrier by contactless scanning. Digital recordings are exemplified, for example, by so-called CD (compact disc) recordings which are noted for their good acoustic properties.

Although CD recordings are substantially easier for users to handle than conventional phonograph records, manufacturing of a CD recording is more complicated than manufacturing conventional recordings. For example, the step of "cutting" signal information onto a compact disc can only be carried out in "super-clean areas" which substantially limit the risk that dust particles will impair the manufacturing process.

In the conventional manufacture of CD recordings, a glass plate is first polished, cleaned, dried and then provided with a photosensitive coating. After cutting digital signal information onto the prepared plate with the aid of a laser beam, a so-called glass "master" is prepared which carries the signal information. Then the surface of the glass master is made electroconductive by silvering and it is used to take a metal "negative" from which, in turn, a metal "positive" is taken. The metal positive then serves as a so-called "mold mother", from which "stampers" are taken. The stampers are used as raw material for pressing of CD discs, which is similar to the pressing of analog discs. After pressing, the CD discs are coated with a thin aluminum layer and a protective layer.

In recent years, conventional methods of producing analog sound recording have been improved. For example, it is no longer required that analog sound information be cut into a lacquer film but, instead, sound information can be directly cut into metallic recording carriers. This newer method of recording sound is sometimes referred to as direct metal mastering (DMM) and has the benefits of providing high dimensional stability of the cut grooves and of eliminating several intermediate manufacturing stages.

As further background to the present invention, it should be understood that successful attempts have been made to use mechanical recording techniques to cut signals of substantially higher frequency than audio frequencies into recording carriers. Such cutting of information signals into recording carriers was performed in a purely analog form; i.e., the recording was in the form of a continuous spiral groove which could be read out by a mechanical scanner. Such recording processes are sometimes referred to as TED video disc processes.

Recording of digital information signals, however, precludes the recording of a continuous groove on a recording carrier. Instead, in digital recording in the CD format, for example, information signals are formed onto information carriers as individual indentations having substantially constant depth and width, but different lengths and spacings. When reading such recordings, a transition between an indentation and the surface of the recording media, or between the media surface and an indentation, is detected and interpreted as an information signal. That is, in the CD format, information signals on a recording media represent a sequence of binary signals which are substantially free from mean values.

In practice, digital recordings of information signals are read by laser beams that detect transitions between the surface of the information-carrying layer and indentations. More particularly, laser beams are virtually completely reflected when the beams strike the recording media surface between indentations but are virtually completely absorbed when directed into an indentation. Absorption of laser beams at indentations result from diffraction, which effectively extinguishes any reflection of the beam. For acceptable operation, the depths of the indentations must be approximately constant and the angles at the sides, or flanks, of the indentations must be maintained relatively exactly. Because the depth of indentations in CD recording is only about 0.1 microns, the manufacturing processes are complex to meet these precise requirements.

OBJECTS AND SUMMARY OF THE INVENTION

One object of the present invention is to provide an electromechanical process for recording information signals, such as CD or structurally similar signals, in a manner which allows simple, inexpensive recording with constant modulation depth such that the process of manufacturing a master is uncomplicated and can be implemented with relatively simply. Another object of the present invention is to provide an apparatus for the implementation of such a process.

A process according to the present invention allows, for the first time, the engraving or cutting of high-frequency digital signals directly into a recording carrier by electromechanical means without a continuous groove being produced. The process of the present invention produces swarf-free deformations without the production of disturbing particles. Accordingly, with the present invention, information signals may be recorded without the need for super-clean areas. It should also be noted that masters manufactured according to the present invention can be used directly to make stampers by galvanic mass.

According to the present invention, a cutting or engraving stylus is not set a fixed distance from the recording carrier but, instead, the stylus and its associated components rest, or float, by their dead weight on the recording carrier or are pressed against the recorder by magnetic or spring force.

BRIEF DESCRIPTION OF THE DRAWINGS

The present invention is explained below with reference to the preferred embodiment. In the drawings.

DETAILED DESCRIPTION OF THE PREFERRED EMBODIMENT

Figure 1:
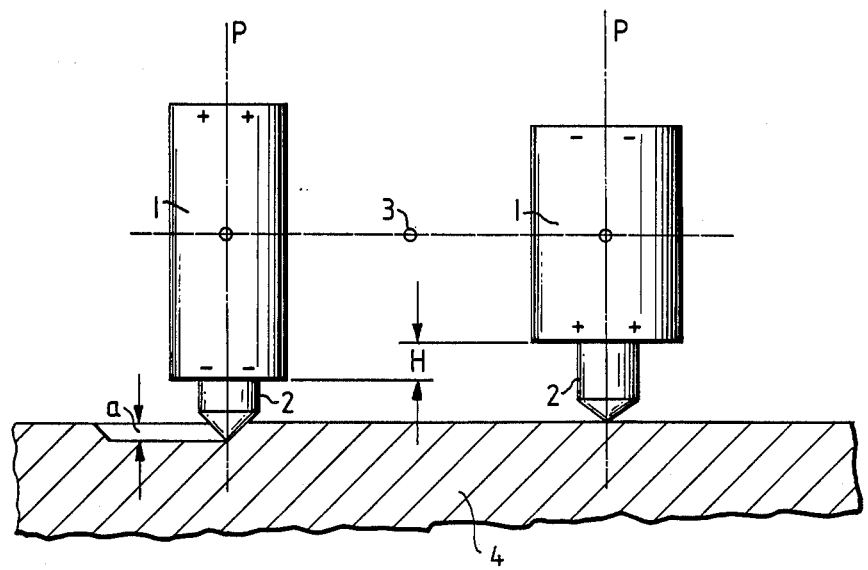
FIG. 1 shows two positional states of an engraving stylus when recording information signals onto a recording carrier.

In FIG. 1, two positions of an engraving stylus 2 are shown. The engraving stylus 2 is located on the underside of a positioning element 1. Preferably, the positioning element is piezoelectric; however, a magnetostrictive positioning element may be used. In practice, positioning element 1 and engraving stylus 2 are rigidly connected to each other, the positioning element is a piezocrystal of the thickness resonator type, and the engraving stylus is made of diamond.

The positioning element 1 is inserted into a holder which is freely movable in the vertical direction or is under slight spring bias. In a preferred embodiment, the positioning element is under magnetic bias. In its rest state, engraving stylus 2 rests on a recording carrier 4. When an electrical signal is applied to the electrodes of the piezocrystal, it changes shape according to the polarity of the signal. On the left side of FIG. 1, the elongated shape of piezocrystal 1 is shown operating with one polarity and, on the right side of FIG. 1, the compressed shape on the piezocrystal is shown as produced by reverse polarity. If a purely digital signal is applied to piezocrystal 1, it undergoes changes in shape which correspond to the applied signal, taking into consideration frequency limitations. The limiting frequency of the arrangement must be high enough to maintain selected entrance and emergence flank angles even at the shortest length of an indentation or the shortest spacing between two indentations. This requirement is met by a sinusoidal oscillation, so that the limiting frequency of the arrangement must not be higher than the highest frequency to be recorded.

Figure 2:
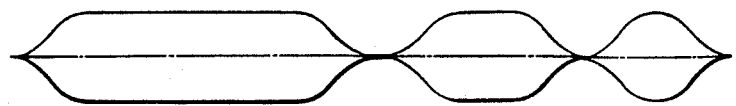
FIG. 2 shows a plan view of a signal track engraved by the stylus of FIG. 1.

FIG. 2 shows a plan view of a signal track. The admission and exit regions of the track are determined by the highest frequency to be recorded, which entails the occurrence of the signal profile shown upon emergence and entrance of the stylus into or out of the recording carrier.

Referring now to the left half of FIG. 1, piezoelement 1 in elongated form presses engraving stylus 2 into the recording carrier 4. The carrier is moved at a predetermined speed relative to the engraving stylus. In the case of a plate-shaped recording carrier, for example, the information signal is engraved in the form of a spiral indentation pattern. Such a form can be achieved by continuous radial adjustment of the mount of the engraving stylus 1.

Although according to the present invention, engraving stylus 1 is not fixed in its vertical relation to the recording carrier surface, indentations "a" are, nevertheless, engraved at approximately constant depth. This is because the static bearing force and deformation characteristics of the recording carrier 4 substantially determine the depth of penetration.

When, as shown on the right side of FIG. 1, piezoelectric positioning element 1 is compressed sufficiently that the tip of the engraving stylus 2 is located on the surface of the recording carrier 4, a certain time will elapse before gravitational force on the apparatus carrying the engraving stylus 2 moves the tip of the engraving stylus down to the static rest position. In the recording of an information signal in CD format, for example, this time is so short that the lowering of the tip of the engraving stylus is only about one percent of the distance between the stylus and the recording carrier.

During operation, the entire arrangement, (consisting of positioning element 1, engraving stylus 2 and the stylus suspending device) remains substantially stable in position, so that the center of gravity position 3 is produced. The distance of center of gravity position 3 from the surface of recording carrier 4 remains approximately constant during recording, regardless of the surface condition of the recording carrier 4. Therefore, the recording carrier 4 need not have an extremely flat surface since the center of gravity position 3 is set to a state of equilibrium over time by the forces produced by the dead weight of the arrangement or of an applied force, and the opposing restoring force of the recording carrier 4 against the stylus 2.

If the lift of the engraving stylus is to equal twice the depth of penetration, the longest time, $t_{max}$, between two indentations must not exceed the following value in order that the lowering of the engraving stylus is not so great that the surface of the recording carrier is touched:

$$t_{max} \leq \sqrt{\frac{2(L - a)}{g}}$$

where "L" denotes the lift, "a" the depth of penetration, and "g" the gravitational acceleration.

When recording varying pulse and pause lengths, the time should be:

$$t \leq \frac{t_{max}}{10}$$

in order that the center of gravity position does not vary by more than 1% between successive indentations.

In the preferred embodiment, the path of stylus 1 is solely within the recording carrier, the upper vertex coming up to the surface of the recording carrier. Thus, in contrast to processes in which the stylus is outside the recording carrier between successive indentations, the invention above-described technique has the advantages that there are no distortions of the recording signal, that all signal information is recorded and, furthermore, that the stylus lift may be reduced to half at the same modulation depth.

If the vertex of the stylus does not come up to the surface, the free width between the two tracks is further restricted by the stylus and, therefore, recording density is reduced. A recording process in which a stylus engraves indentations into a PVC film is known from *RCA Review*, Volume 44, September, 1983, pages 430 to 464. In this reference, engraving is performed by using a piezocrystal which is excited in relation to signal frequency to form surface acoustic waves (SAW) of high frequency, the static bearing force is dimensioned such that no engraving into the surface takes place, and the deformation work is supplied by ultrasonic energy of the piezocrystal and not by the signal itself.

In the printing industry, engraving processes are known in which an engraving stylus describes a path which, on average, is located above the information carrier surface. In such processes, the engraving stylus is driven by a scanning signal which induces a deflection of the engraving stylus along the engraving line at an even distance. Superposed on the scanning signal is an amplitude-modulated information signal which induces a more or less deep penetration of the engraving stylus into the engraving cylinder depending on the brightness of the original. The indentations, or cells, for receiving ink are pared out of the impression cylinder and vary in size and depth according to the brightness of the original. Moreover, in such processes, the distance of the engraving stylus from the engraved cylinder is predetermined in the unmodulated state.

In customary phonograph record technology, the path of the cutting stylus does not run up to the surface but maintains a minimum depth to make possible guidance of the scanner.

The engraving stylus of the apparatus according to the invention is a "floating" bearing and engraves at constant depth. For the example, when recording in the CD data format, the static bearing force is set such that a depth of penetration is about 0.1 microns, depending on the plastic deformability of the recording carrier surface. The lift of the positioning element in this case is likewise 0.1 micron, so that a distortion-free signal is engraved.

The information signal is preferably engraved into a metallic recording carrier (master). In this way, it is possible to make a stamper directly by galvanometric means.

The recording technique according to the invention can also be applied to various recording materials, such as ferromagnetic materials, plastics, glasses and others, so that reading processes such as, for example, magnetic or electrostatic, can be used for the scanning of such recordings.

Figure 3:
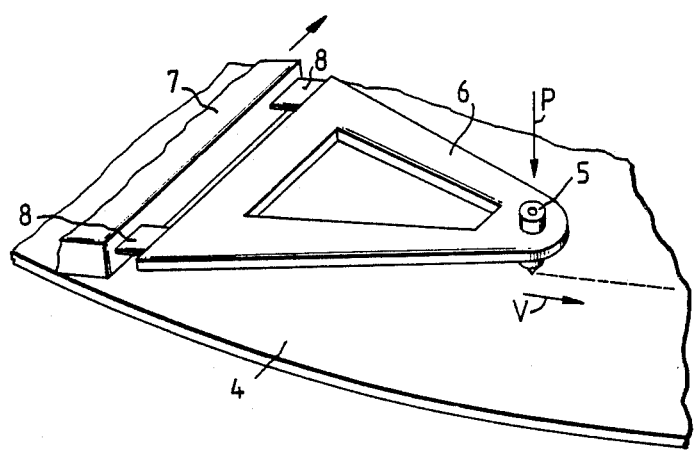
FIG. 3 shows the suspension of the stylus of FIG. 1.

FIG. 3 shows the suspension of an engraving stylus. Engraving stylus 2 and positioning element 1 are arranged in a holder 5 which is located at the tip of an approximately triangular articulated lever 6. At its base, the triangular, articulated lever 6 is connected, via two spring bearings 8, to a fastening block 7. The fastening block 7 is in fixed relation to the recording carrier and is movable in the radial direction with respect to the recording carrier 4 for formation of a spiral recording. Instead of spring bearing 8, a blade bearing may be used. By means of electromagnetic signals sent over the articulated layer, magnetic biasing force can be applied to the articulated lever and thus to the stylus. This electromagnetic biasing force can be regulated or controlled in a way that the vertex points of the signal recording are located at a certain level with respect to the recording carrier, preferably on the surface.

Because of the soft suspension of articulated lever 6 on fastening block 7, positioning element 1 and engraving stylus 2 do not have a precisely fixed position relative to the surface of recording carrier 4. In its rest state, the engraving stylus rests on the recording carrier owing to the dead weight of the engraving stylus 2, positioning element 1 and articulated lever 6 or by spring force of the spring bearing 8.

Figure 4:
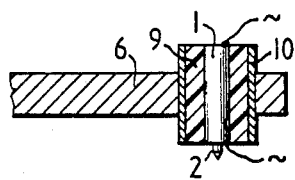
FIG. 4 shows a mount for the stylus.

FIG. 4 shows the mount of positioning element 1. The engraving stylus 2, which is shown as a diamond with pyramid-shaped engraving surface, is connected to the underside of the positioning element 1, which is shown as piezocrystal. The connection can be effected, for example, by an adhesive joint. On the upper side and underside of the piezocrystal are the terminal electrodes for supplying the signal voltage.

The approximately rod-shaped positioning element is borne in an elastic material 9 which surrounds the positioning element. The elastic suspension material makes possible the "floating" bearing of the positioning element and engraving stylus without the articulated lever being moved by the signal to be recorded. Material 9, furthermore, removes heat from the piezoceramic to the tube mount surrounding the material, from which the heat is passed to the articulated lever 6 and into the air. Preferably, the elastic material 9 consists of softly adjusted silicon rubber with a filler such as magnesium oxide for heat removal.

The apparatus according to the invention is suitable both for engraving and for cutting the information signal.

In cutting, it is necessary to remove the swarf from the surface. Due to the smallness of swarf, suction removal is not possible. The cut recording carrier is therefore preferably provided with a detachable adhesive layer which lifts off all cutting swarf when drawn off the recording carrier.

List of Reference Symbols

1. Positioning element
2. Engraving stylus
3. Center of gravity position
4. Recording carrier
5. Holder for positioning element
6. Articulated lever
7. Fastening block
8. Spring bearing
9. Damping material
10. Tube mount
P Bearing force
a Depth of penetration
L Lift
V Tangential velocity of the recording carrier

What is claimed is:

1. In a process for recording information signals onto a generally planar recording carrier surface in which the information signals are applied to the information carrier surface as individual indentations which can be read from the information carrier surface optically, the improvement comprising:
    connecting the stylus to a positioning element which provides a common center of gravity which is substantially stable in position and which allows the stylus to ride in contact with the recording carrier surface; and
    with a bearing force, driving the stylus, in its operating mode, substantially perpendicular to the recording carrier surface to describe a path of individual indentations generally parallel to the recording carrier surface, the path being defined by a lower vertex point which is indented beneath the undeformed surface of the recording carrier and an upper vertex point between successive indentations which lies on, or above, the surface of the recording carrier such that the depth of the thusly formed indentations is independent of the relative elevation of the carrier surface.

2. The process as claimed in claim 1, wherein the stylus is an engraving stylus.

3. The process as claimed in claim 1, wherein the stylus is a cutting stylus.

4. The process as claimed in claim 1 wherein the bearing force is formed by the dead weight at the location of the stylus, and the depth of penetration caused by the bearing force is smaller than the lift of the stylus.

5. The process as claimed in claim 2 wherein the depth of penetration is equal to the lift of the stylus.

6. The process as claimed in claim 4, wherein the depth of penetration is equal to half the lift of the stylus.

7. The process as claimed in claim 4 wherein the time ($t_{max}$) between two indentations is $$t_{max} \leq \sqrt{\frac{2(L-a)}{g}}$$

where g is the gravitational acceleration constant, L is the lift of the engraving stylus and a represents the depth of penetration.

8. The process as claimed in claim 7, wherein the longest time between two indentations is $$t \leq 10 \times t_{max}.$$

9. The process as claimed in claim 1, wherein the bearing force of the stylus is controlable.

10. An apparatus for recording information signals onto a recording carrier with the aid of a stylus which is driven substantially perpendicular to the recording carrier and is connected to a positioning element, and wherein the stylus and the positioning element are arranged, in operating mode, substantially stable in position with respect to the recording carrier with the stylus pressed at riding with a predetermined bearing force in contact with the recording carrier surface, the lift of the stylus is greater than or equal to that depth of penetration of the stylus into the recording carrier such that the depth of the thusly formed penetrations are independent of the relative elevation of the carrier surface.

11. The apparatus as claimed in claim 10, wherein the stylus is piezoelectrically driven.

12. The apparatus as claimed in claim 10, wherein the stylus is magnetostrictively driven.

13. The apparatus as claimed in claim 10, wherein the stylus is a cutting stylus.

14. The apparatus as claimed in claim 10, wherein the stylus is an engraving stylus.

15. The apparatus as claimed in claim 10, wherein stylus and positioning element are rigidly connected to each other.

16. The apparatus as claimed in claim 10, wherein the stylus is pressed against the recording carrier by the dead weight of stylus, positioning element and the weight of the holding members, referred to the engraving location.

17. The apparatus as claimed in claim 10, wherein the stylus is pressed against the recording carrier under spring force.

18. The apparatus as claimed in claim 10, wherein the stylus is pressed against the recording carrier (4) under magnetic force.

19. The apparatus as claimed in claim 14, wherein that surface layer of the recording carrier receiving the information signal is substantially plastically deformable.

20. The apparatus as claimed in claim 10, wherein the positioning element and the stylus are fixed on a movably suspended articulated lever.

21. The apparatus as claimed in one of claim 10 wherein the positioning element is borne in an elastic material.

22. The apparatus as claimed in claim 20 wherein the elastic material is located between positioning element and articulated lever.

23. The apparatus as claimed in claim 21 wherein the elastic material is silicon rubber.

24. The apparatus as claimed in claim 21 wherein the elastic material contains magnesium oxide as filler.

* * * * *

UNITED STATES PATENT AND TRADEMARK OFFICE
CERTIFICATE OF CORRECTION

PATENT NO. : 4,821,250

DATED : April 11, 1989

INVENTOR(S) : Horst Redlich and Guenter Joschko

It is certified that error appears in the above-identified patent and that said Letters Patent is hereby corrected as shown below:

Column 2, line 38, delete "with".

Column 2, line 52, delete "mass" and insert --means-- therefor.

Column 7, line 26, delete "pressed at".

Column 8, line 26, delete "one of".

Signed and Sealed this

Thirtieth Day of April, 1991

Attest:

HARRY F. MANBECK, JR.

Attesting Officer

Commissioner of Patents and Trademarks